350-377

SR

XR 3,474,428

TX 4030W

Oct. 21, 1969 A. M. NELSON ET AL 3,474,428

MAGNETO-OPTICAL REPRODUCER

Filed Jan. 29, 1965

INVENTORS:
Alfred M. Nelson
Henry W. Griffiths
By Smyth, Roston & Pavitt
Attorneys

3474428
OR IN 360/114

United States Patent Office 3,474,428

Patented Oct. 21, 1969

3,474,428

MAGNETO-OPTICAL REPRODUCER

Alfred M. Nelson, Redondo Beach, and Henry W. Griffiths, Torrance, Calif., assignors to The Magnavox Company, Torrance, Calif., a corporation of Delaware Filed Jan. 29, 1965, Ser. No. 429,084

Int. Cl. G11b 5/00

U.S. Cl. 340—174.1 18 Claims

ABSTRACT OF THE DISCLOSURE

This invention relates to a magneto-optical transducer for providing an optical indication of the magnetic states of a magnetizable member. In one embodiment, two thin films of magnetic material are attached to an optical substrate. One thin film is atached directly to the substrate and is provided with a relatively high coercivity and with characteristics to pass a portion of the light directed to it and to reflect the remaining portion of the light. The other thin film is disposed on the first thin film in contiguous relationship to the magnetizable medium to receive by induction the magnetic information on the magnetizable medium and to induce this information in the first thin film. The other thin film is provided with a lower coercivity than the first thin film and with characteristics to reflect the light passing through the first thin film.

In a second embodiment of the invention, only one thin film is used. The thin film is disposed on an optical prism which is provided with a particular index of refraction to produce a total internal reflection of the light directed to the thin film. A thin layer of a dielectric material may be disposed on the thin film and may be provided with a critical thickness, dependent upon its index of refraction and the index of refraction of the substrate, to produce a total internal reflection of the light directed to the thin film.

This invention relates to magneto-optical reproduction. More specifically, the invention relates to a transducer used in an indirect form of magneto-optical reproduction. In certain types of magneto-optical reproduction, information is reproduced which has been recorded on magnetic tape using ordinary magnetic recording techniques. In the indirect form of magneto-optical reproduction, the recorded information is reproduced by moving the magnetic tape in close alignment to a thin film of magnetic material. The magnetic states present in the magnetic tape induce corresponding magnetic states within the thin film. In order to induce the corresponding magnetic states in the thin film, the coercivity of the thin film must be lower than the coercivity of the tape.

The actual reproduction of the information present in the thin film is accomplished by directing light to the face of the thin film. The magnetic states present at different locations on the thin film produce corresponding rotations of the plane of polarization of the light, hereinafter referred to as rotation of light. The direction of rotation of the light is dependent upon the polarity of magnetization at any particular position on the thin film. If the thin film has a square hysteresis loop, the amplitude of the rotation is either at one of two particular levels. When the thin film is not designed to have a square hysteresis loop, the amplitude of rotation of the light is dependent upon the amplitude of the magnetization of the thin film. Whether the thin film has a square hysteresis loop or whether it does not have a square hysteresis loop, a large rotation of the light is desirable. For example, a large rotation of the light is important to produce good contrast and definition when the information is a video signal.

Further descriptions of magneto-optical reproduction will be found in the following copending applications, all of which are assigned to the assignee of the instant application. The applications referred to are: Application Ser. No. 88,833 filed Feb. 13, 1961, in the name of Alfred M. Nelson and entitled "Transducing Apparatus and Method"; Application Ser. No. 124,676, filed July 17, 1961, in the name of Alfred M. Nelson and entitled "Magneto-Optical Transducer"; Application Ser. No. 145,212 filed Oct. 16, 1961, now abandoned, in the name of Henry W. Griffiths and entitled "Magneto-Optical Transducer"; Application Ser. No. 165,602 filed Jan. 2, 1962, now Patent No. 3,123,701 in the name of Henry W. Griffiths and entitled "Magneto-Optical Transducer"; and Application Ser. No. 244,170 filed Dec. 12, 1962, in the name of Alfred M. Nelson and entitled "Magneto-Optical Transducing System."

One of the problems inherent in any magneto-optical reproducing system is the finding of magnetic materials for the thin films which have the ideal combination of characteristics of low coercivity with high rotation. In the current art it is common to use nickel-iron alloys for the thin film since the nickel-iron alloys have a low coercivity coupled with a low to medium amount of rotation. The nickel-iron alloys have proved satisfactory but still far from ideal. The films currently in use and which are characterized as thin have thicknesses corresponding to a range of 1,000 to 3,000 Angstroms.

Using the nickel-iron alloys it has been found that it is possible to get extremely high rotation if the magneto-optical reproducing system experiences interference effects. However, the use of interference effects results in a loss of reflectivity and since:

$$F=\theta\sqrt{R}$$

where

F=figure of merit,
$\theta$=angle of rotation, and
R=reflectivity, the use of interference effects results in a great loss of light as seen by the above equation. Therefore, another problem inherent in the use of the use of the thin films is to prevent loss of light. For example, the thin films used at the present time have a sufficient thickness for preventing the loss of light through the thin film. Thicknesses in the range between 1,000 to 3,000 Angstroms are sufficient to provide almost a complete reflection of the light.

It is known, for example, that plain iron or silicon-iron alloy produces a much higher rotation of light than the nickel-iron alloy used in the past for thin films. However, plain iron and silicon-iron have relatively high coercivity. The high coercivity of iron or silicon-iron degrades the response of thin films made of these materials to short wavelength information signals, and the film, therefore, responds only to low density information. It has been discovered that iron and silicon-iron show a high coercivity when measured in bulk quantities and that the high coercivity measurement is the same when the thickness of the film is greater than 1,000 Angstroms. In other words, the coercivity of thin films greater than 1,000 Angstroms approximates the bulk coercivity measurement of the same material.

However, when very thin films of iron or silicon-iron having thickness on the order of 100 to 1,000 Angstroms are used, the response of the iron or silicon-iron to short wavelength information signals is surprisingly high. The bulk coercivity of the material is still relatively high compared to nickel-iron thin films, but the very thin films of iron or silicon-iron can be made to read high density information. The films now proposed for use, and characterized as very thin, have thickness on the order of 100 to 1,000 Angstroms. The use of very thin films does not degrade the high rotation which is characteristic of the iron or silicon-iron, but the use of very thin film does increase the transmissivity. That is, in the use of very thin films having thicknesses below 1,000 Angstroms, there is a significant amount of light transmitted through the film. This means that the very thin films have a significant loss of light through low reflectivity, and, therefore, the figure of merit for these films would be low.

The present invention relates to methods of using very thin films of suitable materials such as iron or silicon-iron in order to have high rotation and a high response to short wavelength information signals, but without any significant loss due to the high transmissivity of the very thin films.

In a first embodiment of the invention, a double layer of films is used wherein a first layer next to the magnetic tape is made from nickel-iron and has a thickness between 1,000 and 3,000 Angstroms and wherein a second layer of iron or silicon-iron is located adjacent to the nickel-iron layer and has a thickness between 100 and 1,000 Angstroms. The layer of iron or silicon-iron provides a high angle of rotation. The layer of nickel-iron is used to provide an even greater response to short wavelength information signals than can be obtained with very thin films of iron or silicon-iron. In addition, the layer of nickel-iron prevents any significant loss of light which is transmitted through the layer of the iron or silicon-iron. The combination of the two layers provides a low over-all coercivity, high reflectivity and has a higher angle of rotation than can be accomplished with nickel-iron alone.

A second embodiment of the invention uses a very thin film of iron or silicon-iron having a thickness between 100 and 1,000 Angstroms and has this very thin film deposited on a surface of a prism located adjacent to the magnetic tape. The prism is designed to provide total internal reflection. It will be appreciated that structures other than a prism may be used to provide for the total internal reflection. The total internal reflection is accomplished by directing the light toward the prism from a particular direction and by having the magneto-optical transducer constructed of materials having refractive indexes so as to produce the total internal reflection.

The high transmissivity of the very thin films is used to provide additional rotational effects. This is accomplished since the normal Kerr magneto-optical effect is combined with the Faraday magneto-optical effect due to the transmission of the light through the very thin film during the total internal reflection to produce a very high rotation of the light.

In the second embodiment of the invention very high rotations are accomplished with a low loss of reflectivity while maintaining a high response to short wavelength information signals. The particular thickness of the very thin film is critical and has a particular value in accordance with the material used. For example, if the light is linearly polarized in the plane of incidence, the angle of incidence is 45°, and the material used is iron, the critical thickness is approximately 215 A°. The use of the prism with a critical thickness of material to provide a total internal reflection can be used to increase the rotation of any magnetic material. In addition, a dielectric layer is used to provide an increased reflectivity without changing the high rotation.

A clearer understanding of the invention will be seen with reference to the following description and drawings wherein.

Figure 1:
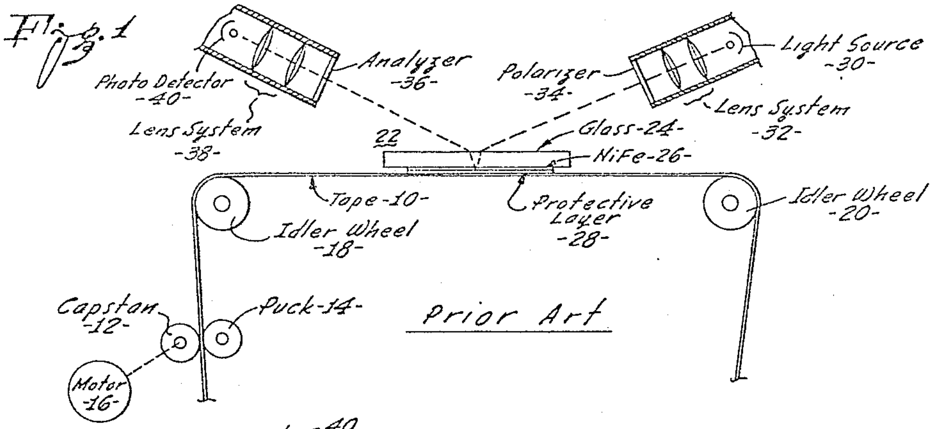
FIGURE 1 is a schematic diagram of a magneto-optical reproducing system in accordance with the prior art.

In FIGURE 1 a tape 10 is moved by a rotating capstan 12 and a rubber puck 14 from a payout reel (not shown). The capstan 12 is rotated by a motor 16. The tape 10 is transported by idler wheels 18 and 20 and passes to a takeup reel (not shown). A magneto-optical transducer 22 is located intermediate the idler wheels 18 and 20 adjacent to the tape 10.

The magneto-optical transducer 22 includes a base plate 24 of glass on which a thin film 26 of nickel-iron having a thickness between 1,000 and 3,000 Angstroms is deposited. The thin film 26 of nickel-iron is protected by a layer 28 of dielectric material. The dielectric material has a low coefficient of friction to allow the tape 10 to move easily over the surface of the protective layer 28. A light source 30 produces light energy which is focused to a narrow beam by a lens system 32. The narrow beam of light energy then passes through a polarizer 34 which only allows linearly polarized light to pass.

The beam of light passes through the glass 24 and is reflected from the thin film 26 of nickel-iron. However, due to the Kerr magneto-optical effect, the magnetic states present in the thin film 26 produce corresponding rotations of the light. Also, the magnetic states present in the tape 10 induce corresponding magnetic states in the thin film 26. Therefore, the rotation of the light beam is in a direct relation to the magnetic states in the tape 10. The rotated beam of light is reflected from the thin film 26 and is directed towards an analyzer 36. The analyzer 36 is essentially a light polarizer and allows only the passage of rotated light. A lens system 38 focuses the rotated light on a surface of a photo detector 40. The photo detector 40 produces an electrical signal in accordance with the received light, and since the received light passed by the analyzer 36 is a direct indication of the amount of rotation of the original beam of light, the electrical signal produced by the photo detector 40 is a direct representation of the information on the tape 10. Particular structures and details of magneto-optical reproducing systems as shown in FIGURE 1 have been disclosed in the copending applications referred to earlier, and for a fuller explanation of the magneto-optical reproducing technique, reference is made to those copending applications.

Figures 2, 3, 4, 5, 6:
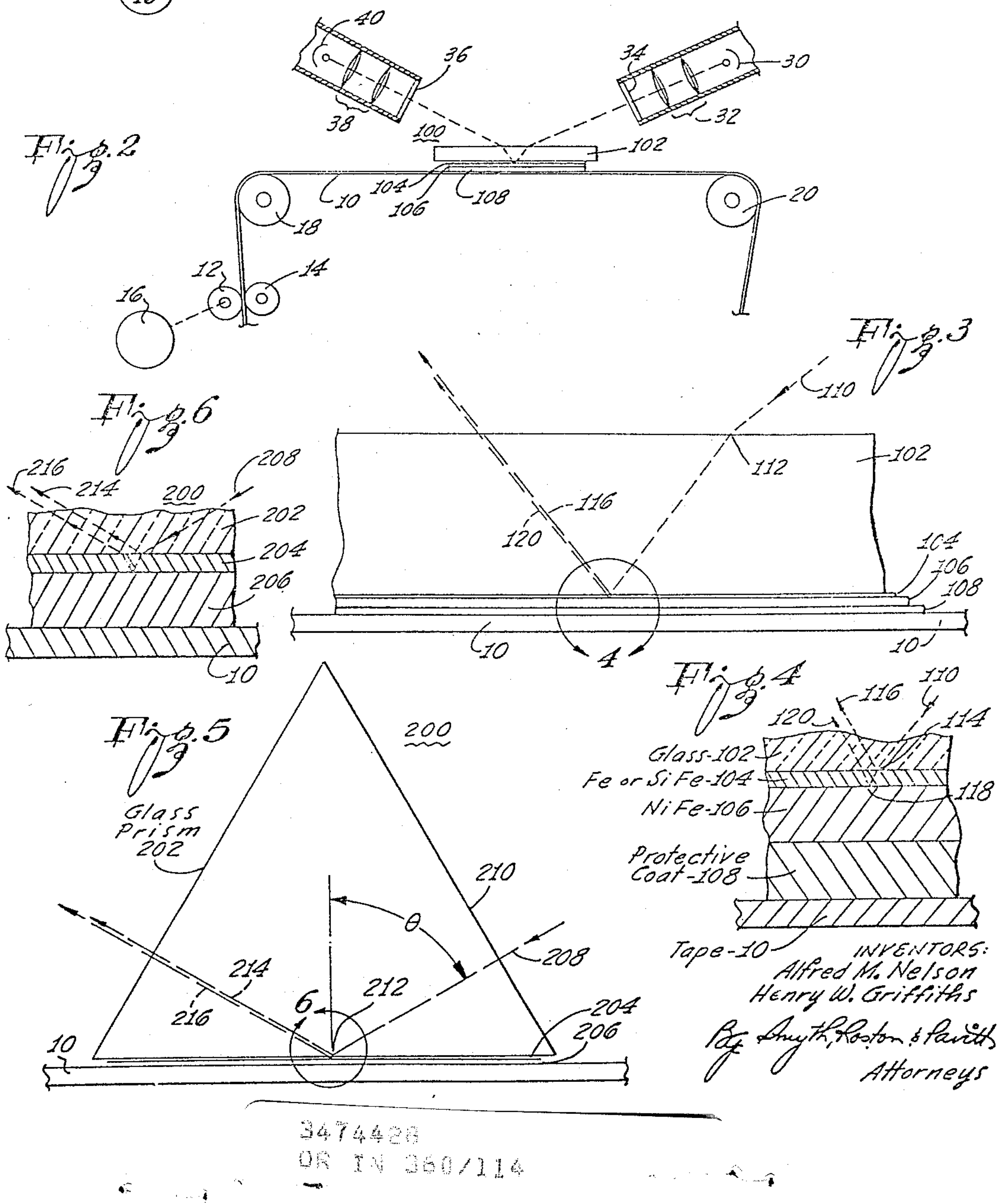
FIGURE 2 is a schematic diagram of a magneto-optical reproducing system in accordance with a first embodiment of the invention.
FIGURE 3 is a partial showing of a first embodiment of a transducer which may be used with the magneto-optical reproducing system of FIGURE 2.
FIGURE 4 is a detailed showing of the encircled portion "4" of FIGURE 3.
FIGURE 5 is a partial showing of a second embodiment of a transducer which may be used with the magneto-optical transducing system of FIGURE 2.
FIGURE 6 is a detailed showing of the encircled portion "6" of FIGURE 5.

In FIGURE 2 elements which are the same as those shown in FIGURE 1 are given the same reference characters. Therefore, the tape 10 is moved by the capstan system which includes a capstan 12, puck 14, motor 16 and idler wheels 18 and 20. The tape 10 is moved past a magneto-optical transducer 100 located intermediate the idler wheels 18 and 20. The transducer 100 includes a base plate 102 of a transparent material such as glass, a very thin film 104 of iron or silicon-iron having a thickness between 100 and 1,000 Angstroms, a second thin film 106 of nickel-iron having a thickness between 1,000 and 3,000 Angstroms and a protective layer 108. A clearer understanding of the first embodiment of the invention will be had with reference to FIGURES 3 and 4 which illustrate in more detail the magneto-optical transducer 100.

In FIGURES 3 and 4 the information recorded magnetically on the tape 10 produces magnetic fields which pass through the protective layer 108 and induce corresponding magnetic states in the thin film 106 of nickel-iron. Since the thin film 106 of nickel-iron has a low coercivity, the thin film 106 of nickel-iron responds to high density or short wavelength information which has been recorded on the tape 10. In turn, the magnetic states induced into the thin film 106 of nickel-iron induce corresponding magnetic states in the very thin film 104 of iron or silicon-iron and the combination of the two films exhibits a coercivity approximating the coercivity produced by the nickel-iron alone. This combination of thin films does respond to high density or short wavelength information. It is to be appreciated that the above explanation is simplified since the magnetic fields produced by the tape 10 would also have a direct effect in the induction of corresponding magnetic states in the very thin film 104.

When the light energy 110 reaches the surface of the base plate 102, it is refracted at the position 112 in a known manner and is directed towards the very thin film 104. A particular portion of the light energy 110 is reflected from the surface of the very thin film 104 at position 114 in accordance with the transmissivity of the very thin film 104 and the reflected portion of the light energy is rotated in accordance with the magnetic states in the very thin film 104 due to the Kerr magneto-optical effect to produce a first informational light signal 116. Since the very thin film 104 is less than 1,000 Angstroms in thickness and therefore has a high transmissivity, a significant amount of light passes through layer 104 and is rotated due to the Faraday magneto-optical effect and is then reflected from the surface of the thin film 106 at a position 118. The light energy reflected at position 118 is also rotated due to the Kerr magneto-optical effect in the layer 106 and is additionally rotated due to the Faraday magneto-optical effect as it again passes through the layer 104. Since the thin film 106 has a thickness greater than 1,000 Angstroms and, therefore, has a very low transmissivity, essentially all of the light energy which reaches the surface of the layer 106 is reflected through the layer 104 to produce a second informational light signal 120.

It is to be appreciated that this above description is simplified since the light energy is continuously reflected at different positions throughout the thickness of the very thin film 104, and the above description merely shows the collective reflection of the light energy at the two extremes. However, the total rotated light contained in the two informational light signals 116 and 120 is substantially identical to the actual information which is produced by the magneto-optical transducer 100. The information is, therefore, the combination of the two informational light signals 116 and 120 and the two signals are combined by the photo detector 40 illustrated in FIGURE 2.

It can be seen that the magneto-optical transducer illustrated in FIGURES 3 and 4 uses a combination of thin films composed both of iron or silicon-iron and nickel-iron to give a higher rotation to received light than a single thin film of nickel-iron. Moreover, since a substantial portion of the light passes back and forth through the thin film 104, the rotation of the light is not only produced by the Kerr effect at points of reflection but the rotation of the light is also produced by the Faraday effect during transmission of the light through the very thin film 104. The magneto-optical transducer of FIGURES 3 and 4 has a substantially increased rotation of light energy without any significant loss of light. Also, the response of the transducer 100 to short wavelength information is comparable to the response of a single nickel-iron thin film. However, the magneto-optical transducer 100 produces an increased rotation of light in comparison to the prior art transducers.

FIGURES 5 and 6 illustrate a second embodiment of the invention and in particular show a magneto-optical transducer 200 which may be used in place of the magneto-optical transducer 100 of FIGURES 3 and 4. The magneto-optical transducer 200 may be used with the reproducing system illustrated in FIGURE 2. The magneto-optical transducer 200 includes a base 202 of suitable material such as glass which is constructed in the form of a prism. A very thin film 204 of iron or silicon-iron is disposed on one surface of the prism 202 and a protective layer 206 covers the very thin film 204. The magnetic tape 10 is disposed adjacent to the protective layer 206. The very thin film 204 has a thickness in the order of 100 to 1,000 Angstroms and, although the bulk coercivity of the very thin film 204 would be too high to reproduce high density or short wavelength information signals, it has been discovered, as noted above, that very thin films do respond to the short wavelength information signals. Therefore, the magnetic fields produced by the magnetic tape 10 induce corresponding magnetc states in the very thin film 204 without any significant loss in information.

Light energy 208 enters the magneto-optical transducer 200 at a position normal to the surface 210 of the prism 202. Since the light energy 208 enters at a position normal to the surface 210, no refraction occurs at this surface. The light energy strikes the very thin film 204 at a position 212 and a portion of the light energy 208 is reflected and is rotated due to the Kerr effect to produce a first informational light signal 214.

Since the film 204 is extremely thin (less than 1,000 Angstroms), a significant portion of the light energy 208 is transmitted through the very thin film 204 and is rotated in accordance with the Faraday effect.

The total internal reflection in the prism produces a second informational signal 216 and a combination of two signals 214 and 216 is received by the photo detector 40 illustrated in FIGURE 2. It is to be appreciated that the above explanation has been simplified since a series of reflections would take place throughout the layer 204. The above explanation is given with respect to the two collective outside reflections at the extreme positions and, therefore, the combination of the two signals 214 and 216 is substantially identical to the actual informational signal which is produced by the magneto-optical transducer 200 illustrated in FIGURES 5 and 6.

The prism is constructed to have total internal reflection in accordance with the formula:

$$\sin\theta \geq \frac{n_0}{n_1}$$

where $n_1$ is the index of refraction of prism 200 and
$n_0$ is the index of refraction of the atmosphere.

However, it is desirable to include a protective layer 206 of dielectric material covering the very thin layer 204.

It has been found that the use of the dielectric material as a protective layer enhances the reflectivity of the transducer. Actually, the thickness of the dielectric layer is critical in accordance with the dielectric material used.

Also, the magneto-optical transducer 200 may be designed in accordance with the formula:

$$\sin\theta \geq \frac{n_2}{n_1}$$

where:

$n_2$ is equal to the index of refraction of the protective layer 206 and
$n_1$ is equal to the index of refraction of the glass prism 202.

With a proper design of the magneto-optical transducer as explained above, the internal reflection actually takes place within the dielectric layer 206. This minimizes the losses that occur when the tape 10 is in close contact with the dielectric layer 206. When the tape is in close contact with the dielectric layer, the light enters into and is absorbed in the tape in great quantities.

As can be seen in FIGURES 5 and 6, the magneto-optical transducer 200 uses a single very thin film of iron or silicon-iron and, therefore, has a high angle of rotation of the received light energy. The transducer 200, therefore, produces much higher rotation in the light energy than would be produced if a single thin film of nickel-iron is used. Moreover, since the very thin film 204 is extremely thin and has substantial transmissivity, a significant amount of rotation of the light is accomplished due to the Faraday effect in addition to the normal rotation of light which is produced by the Kerr effect. Of course, the Faraday effect is used since the various elements of the magneto-optical transducer 200 are designed to provide total internal reflection so that the light which passes through the very thin film 204 is not lost.

As can be seen from the foregoing description, the two embodiments of the invention use very thin films of iron or silicon-iron to provide increased rotation of the light energy. It is to be appreciated that although iron and silicon-iron have been mentioned for the very thin films, alloys other than silicon-iron can be used as long as iron is the principal ferromagnetic material included within the alloy. For example, germanium-iron and iron cobalt can be used in place of the silicon-iron. The increased rotation improves contrast and definition in a video signal without a sacrifice in resolution.

It will be appreciated that the invention has been described with reference to particular embodiments and that other embodiments and modifications may be made. Therefore, the invention is only to be limited by the appended claims.

What is claimed is:

1. A magneto-optical transducer utilizing a magneto-optical effect to produce a non-magnetic representation of the magnetic states of a first magnetic material, including a first thin film composed of magnetic material and having a first coercivity and disposed in contiguous relationship to the first magnetic material to receive induced magnetic states in accordance with the magnetic states in the first magnetic material, a second very thin film composed of a magnetic material and having a second coercivity higher relative to the first thin film and with the second thin film disposed in contiguous relationship to the first thin film and with the first thin film located between the second very thin film and the first magnetic material to have the second very thin film receive induced magnetic states in accordance with the magnetic states in the first magnetic material and the first thin film, light transmissive means having a surface disposed in contiguous relationship with the second very thin film for supporting the second very thin film in contiguous relationship with the first thin film, means for directing light toward the light transmissive means to obtain a reflection of light by the first and second thin films and a rotation of such light by the first and second thin films in accordance with the magnetic states in the first magnetic material, and means disposed relative to the light transmissive means for receiving the light reflected by the first and second thin films and for providing output indications in accordance with the characteristics of the rotated light.

2. A magneto-optical transducer utilizing a magneto-optical effect to produce a non-magnetic representation of magnetic states, including a very thin film composed of magnetic material alowing the passage of light, and a transparent substrate having at least two surfaces in a particular relationship different from a parallel or coplanar relationship and having a third surface disposed in contiguous relationship to the very thin film and in relationship to the two surfaces, different from a parallel or coplanar relationship, for supporting the very thin film and for receiving light from a first one of the two surfaces and for rotating the light in accordance with the magnetic states in the very thin film, the transparent substrate having a particular index of refraction for producing total internal reflection of the light directed to the very thin film to direct the rotated light to the second one of the two surfaces.

3. A magneto-optical transducer utilizing a magneto-optical effect to produce a non-magnetic representation of the magnetic states of a first magnetic material, including a very thin film composed of magnetic material allowing the passage of light disposed in contiguous relationship to the first magnetic material to receive induced magnetic states in accordance with the magnetic states in the first magnetic material, and a transparent substrate of prismatic configuration having at least two planar side surfaces in a particular angular relationship and having a third side surface disposed in contiguous relationship to the very thin film and in angular relationship to the two planar side surfaces for supporting the very thin film and with the various components of the magneto-optical transducer constructed of materials having refractive indexes to produce total internal reflection from light received from a first one of the two planar side surfaces in a direction perpendicular to the first planar side surface.

4. The magneto-optical transducer of claim 3 additionally including a protective layer of dielectric material having a particular thickness to produce a maximum reflection of light received from the first one of the two planar side surfaces.

5. The magneto-optical transducer of claim 3 additionally including a protective layer of idelectric material covering the very thin film and having a refractive index to produce the total internal reflection within the protective layer.

6. A magneto-optical transducer utilizing a magneto-optical effect to produce a non-magnetic representation of the magnetic states of a first magnetic material, including a first thin film composed of magnetic material and having a first coercivity and disposed in contiguous relationship to the first magnetic material to receive induced magnetic states in accordance with the magnetic states in the first magnetic material, a second very thin film composed of magnetic material and having a second coercivity higher than the coercivity of the first thin film and with the second very thin film disposed in contiguous relationship to the first thin film and with the first thin film located between the second very thin film and the first magnetic material and having the second very thin film receive induced magnetic states in accordance with the magnetic states in the first magnetic material and the first thin film, light transmissive means for supporting the second very thin film and the first thin film on the second very thin film, first means disposed relative to the second very thin film and the first thin film and the light transmissive means for directing a spot of light toward the light transmissive means and the second very thin film and the first thin film to obtain a rotation of the light by the second very thin film and the first thin film in accordance with the magnetic states in the second very thin film and the first thin film and to obtain a reflection of the rotated light, and second means disposed to receive the light reflected from the second very thin film and the first thin film for developing a signal representing the rotation in the light reflected by the second very thin film and the first thin film.

7. A magneto-optical transducer utilizing a magneto-optical effect to produce a non-magnetic representation of the magnetic states of a first magnetic material, including a first thin film composed of magnetic material and having a first coercivity and low transmissivity and disposed in contiguous relationship to the first magnetic material to receive induced magnetic states in accordance with the magnetic states in the first magnetic material, a second very thin film composed of magnetic material and having a second coercivity higher than the coercivity of the first thin film and with the second thin film having a high transmissivity and disposed in contiguous relationship to the first thin film and with the first thin film located between the second very thin film and the first magnetic material and having the second very thin film receive induced magnetic states in accordance with the magnetic states in the first magnetic material and the first thin film, light transmissive means for supporting the second very thin film and the first thin film on the second very thin film, first means disposed relative to the second very thin film and the first thin film and the light transmissive means for directing a spot of light toward the light transmissive means and the second very thin film and the first thin film and to obtain a rotation of the light by the first thin film and the second very thin film in accordance with the magnetic states in the second very thin film and the first thin film and to obtain a reflection of a portion of the rotated light from the second very thin film to produce a first informational light signal and to obtain a reflection of the remaining portion of rotated light passing through the second very thin film from the first thin film to produce a second informational light signal, and second means disposed to receive the first and second informational light signals for developing a third signal representing the magnetic states in the second very thin film and the first thin film in accordance with the rotational characteristics of the first and second informational light signals.

8. A magneto-optical transducer utilizing a magneto-optical effect to produce a non-magnetic representation of the magnetic states of a first magnetic material, including a very thin film composed of magnetic material allowing the passage of light and disposed in contiguous relationship to the first magnetic material to receive induced magnetic states in accordance with the magnetic states in the first magnetic material, light transmissive means having incident and emergent surfaces in a particular angular relationship to each other, different from a parallel or coplanar relationship and having a third surface, different from a parallel or coplanar relationship to the incident and emergent surfaces, disposed in contiguous relationship with the very thin film for supporting the very thin film in contiguous relationship with the first magnetic material, the light transmissive means being constructed of a material having a particular index of refraction for cooperating with the very thin film to obtain a total internal reflection to the emergent surface of the light passing through the incident surface, a source of light disposed relative to the incident surface of the light transmissive means to transmit light through the incident surface to the very thin film to obtain a rotation of the light in accordance with the magnetic states in the very thin film, and means disposed relative to the emergent surface for receiving the light passing through the emergent surface and for developing a signal representing the magnetic states in the very thin film.

9. The magneto-optical transducer of claim 8 additionally including a protective layer of dielectric material intermediate the very thin film and the first magnetic material and with the protective layer having a particular index of refraction and having a critical thickness, dependent upon the indexes of refraction of the protective layer of dielectric material and the light transmissive means, to obtain a maximum reflection of the light to the emergent surface of the light transmissive means.

10. A magneto-optical transducer utilizing a magneto-optical effect to produce a non-magnetic representation of magnetic states, including a very thin film composed of magnetic material allowing the passage of light, a transparent substrate having at least two surfaces in a particular relationship different from a parallel or copolanar relationship and having a third side surface disposed in contiguous relationship to the very thin film and in relationship to the two surfaces, different from a parallel or coplanar relationship, for supporting the very thin film and for receiving light from a first one of the two surfaces and for rotating the light in accordance with the magnetic states in the very thin film, the transparent substrate having a particular index of refraction for producing total internal reflection of the rotated light to direct the rotated light to the second one of the two surfaces, a source of light disposed relative to the first surface for transmitting light to the first surface, and means disposed relative to the second surface for receiving light passing through the second surface and for producing a signal representing the magnetic states in the very thin film.

11. A magneto-optical transducer utilizing a magneto-optical effect to produce a non-magnetic represention of the magnetic states of a first magnetic material, including a very thin film composed of magnetic material allowing the passage of light disposed in contiguous relationship to the first magnetic material to receive induced magnetic states in accordance with the magnetic states in the first magnetic material, a transparent substrate of prismatic configuration having at least two planar side surfaces in a particular angular relationship and having a third side surface disposed in contiguous relationship to the very thin film and in angular relationship to the two planar side surfaces for supporting the very thin film and with the various components of the magneto-optical transducer constructed of materials having refractive indexes to provide total internal reflection from light received from a first one of the two planar side surfaces in a direction, perpendicular to the first planar side surface, a source of light disposed relative to the first planar side surface for transmitting light to the first planar side surface, and means disposed relative to the second planar side surface for receiving light passing through the second planar side surface and for producing a signal representing the magnetic states in the very thin film.

12. The magneto-optical transducer of claim 11 additionally including a protective layer of dielectric material covering the very thin film and having a refractive index to produce the total internal reflection within the protective layer.

13. A magneto-optical transducer using a magneto-optical effect to produce a non-magnetic representation of magnetic states, including a very thin film composed of magnetic material which thin film reflects a portion of the light and allows a passage of a significant portion of the light and rotates the reflected and passed light in accordance with the magnetic states in the thin film, and a transparent substrate for supporting the very thin film and for receiving light directed to the substrate and with the light rotated in accordance with the magnetic states in the very thin film and with the substrate having a particular index of refraction for producing total internal reflection of the light passed by the very this film to direct the rotated light out of the substrate.

14. A magneto-optical transducer for indicating magnetic states including a very thin film composed of magnetic material, which thin film is constructed to receive light and to reflect a portion of the light and allow a passage of a significant portion of the light and to rotate the received light in accordance with the magnetic states in the thin film, the transducer using a magneto-optical effect to produce a non-magnetic representation of magnetic states, including a transparent substrate having at least two surfaces in a particular relationship different from a parallel or a coplanar relationship and having a third surface disposed in contiguous relationship to the very thin film and in relationship, different from a parallel or a coplanar relationship, to the two surfaces for supporting the very thin film and for receiving light from a first one of the two surfaces and for rotating the light in accordance with the magnetic states in the very thin film, the transparent substrate having a particular index of refraction for producing total internal reflection of the light to direct the rotated light to the second one of the two surfaces.

15. A magneto-optical transducer including a thin magnetic film for use with a magnetic medium having magnetic information recorded on the medium and with the thin film magnetically coupled to the magnetic medium to receive the magnetic information on the magnetic medium and with light directed to the thin film to produce light from the thin film having rotations in accordance with the magnetic information in the thin film and with the thin film being of such thin dimensions to obtain a reflection of a portion of the light and a passage through the thin film of a significant portion of the light, including a layer of dielectric material disposed on the thin magnetic film and having a particular index of refraction and a critical thickness dependent upon the particular index of refraction to obtain a reflection by the dielectric material of the light passing through the thin film.

16. The magneto-optical transducer of claim 15 wherein the layer of dielectric material has a critical thickness dependent upon the particular index of refraction for producing an optimum reflection by the layer of the dielectric material of the light passing through the thin film.

17. A magneto-optical transducer for use with a magnetic medium having magnetic information recorded on the medium and with the magneto-optical transducer magnetically coupled to the magnetic medium to receive the magnetic information on the magentic medium and with light directed to the magneto-optical transducer to produce light from the magneto-optical transducer having rotations in accordance with the magnetic information in the magneto-optical transducer, including a thin magnetic film for receiving the magnetic information on the magnetic medium and for receiving the light and producing light having rotations in accordance with the magnetic information, the thin magnetic film having relatively thin dimensions to reflect a portion of the light and to pass a significant portion of the light through the thin film, and a layer of dielectric material disposed on the thin magnetic film and having a thickness and a particular index of refraction for obtaining a reflection by the layer of dielectric material of the light passing through the thin film.

18. The magneto-optical transducer of claim 17 wherein the layer of dielectric material has a critical thickness dependent upon the particular index of refraction for producing an optimum reflection by the layer of dielectric material of the light passing through the thin film.

References Cited

UNITED STATES PATENTS

| | | | |
|---|---|---|---|
| 3,171,754 | 3/1965 | Smaller | 340—174.1 |
| 3,174,140 | 3/1965 | Hagopien | 340—174.1 |
| 3,229,273 | 1/1966 | Baaba | 340—174.1 |

TERRELL W. FEARS, Primary Examiner

U.S. Cl. X.R.

340—173